United States Patent
Hanaoka et al.

(10) Patent No.: US 7,624,324 B2
(45) Date of Patent: Nov. 24, 2009

(54) FILE CONTROL SYSTEM AND FILE CONTROL DEVICE

(75) Inventors: Yuuji Hanaoka, Kawasaki (JP);
Toshiyuki Yoshida, Kawasaki (JP);
Yuichi Ogawa, Kawasaki (JP);
Terumasa Haneda, Kawasaki (JP);
Kazunori Masuyama, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 11/237,655

(22) Filed: Sep. 29, 2005

(65) Prior Publication Data
US 2006/0190772 A1    Aug. 24, 2006

(30) Foreign Application Priority Data
Feb. 18, 2005   (JP) .............................. 2005-041539

(51) Int. Cl.
G06F 11/00    (2006.01)
(52) U.S. Cl. .................. 714/746; 714/754; 714/724
(58) Field of Classification Search ................ 714/746, 714/754, 718, 724, 742, 769, 770, 702
See application file for complete search history.

(56) References Cited

U.S. PATENT DOCUMENTS

| | | | | |
|---|---|---|---|---|
| 3,786,439 A | * | 1/1974 | McDonald et al. | 714/702 |
| 4,371,929 A | * | 2/1983 | Brann et al. | 710/45 |
| 5,805,797 A | | 9/1998 | Sato et al. | |
| 6,631,447 B1 | * | 10/2003 | Morioka et al. | 711/141 |
| 2004/0083309 A1 | | 4/2004 | Yamamoto | |

FOREIGN PATENT DOCUMENTS

| | | |
|---|---|---|
| JP | 49-91739 A | 9/1974 |
| JP | 3-172920 | 7/1991 |
| JP | 7-123134 A | 5/1995 |
| JP | 8-237801 A | 9/1996 |
| JP | 10-224392 A | 8/1998 |
| JP | 2001-77832 A | 3/2001 |
| JP | 2002-507364 A | 3/2002 |
| JP | 2002-344539 A | 11/2002 |
| WO | WO-99/00944 | 1/1999 |

OTHER PUBLICATIONS

Japanese Office Action, mailed by the Japanese Patent Office on Apr. 7, 2009 in connection with corresponding JP 2005/41539.

* cited by examiner

*Primary Examiner*—Esaw Abraham
*Assistant Examiner*—Fritz Alphonse
(74) *Attorney, Agent, or Firm*—Fujitsu Patent Center

(57) ABSTRACT

A file control system performing DMA (direct memory access) transfer is provided. The file control system includes file control devices, and each of the file control devices is provided between a host computer and an external storage device. A first file control device among the file control devices checks for errors in the data read from a memory, changes the error detection code added to the read data from a first error detection code to a second error detection code, changes at least a part of the data when an error is detected, and executes DMA-transfer of the data, which is changed or is not changed, to a second file control device of the transfer destination.

16 Claims, 3 Drawing Sheets

FILE CONTROL SYSTEM AND FILE CONTROL DEVICE

BACKGROUND OF THE INVENTION

1. Field of the Invention

The present invention is related to a file control system which is configured by a plurality of file control devices connected to each other and the file control device used in the system, and more specifically, a technique for highly reliable file control preventing data inconsistency when an uncorrectable error occurs during data transfer between the file control devices in the file control system.

2. Description of the Related Art

In order to carry out a smooth and high-speed data transfer between a host computer and an external storage device, a file control device, controlling writing and reading of the data to the external storage device following the command of the host computer, is configured between the host computer and a high-capacity external storage device. The file control device has memory internal, and access time gap between the external storage device and the host computer is eliminated by caching a part of the data in the memory every time the host computer carries out the process. In addition, a file control system etc. with higher reliability has been devised by configuring a plurality of file control devices between the host computer and the external storage device.

The file control device and the file control system stop operations of elements thereof, when an operation error occurs during writing/reading the data in/from the external storage device, and when memory inconsistency occurs, the inconsistency is to be recovered. By so doing, data consistency is maintained (Patent Document 1, for example).

Patent Document 1 discloses a control device (controller), which is able to stop operations of its elements as soon as possible when operation error such as data number error and verification error occurs in an error correcting circuit or DMA controller etc. in the control device controlling an information-recording disk device connected between a host computer and the information-recording disk device.

Patent Document 1: Japanese unexamined patent publication bulletin No. 03-172920 "Controller for Information Recording Disk Device"

The existing control device described in Patent Document 1 transmits signals in the order of an operation abnormality signal, operation error occurrence signal and an operation stop signal as soon as possible, when operation error, such as data number error, verification error and uncorrectable error, occurs in its own elements, and let each element stop its operation. Thus, it is possible to cancel the operation in relatively early timing.

However, in a configuration in which a plurality of file control devices are connected and a plurality of file control devices carry out data transfer (writing/reading) using memory, which each file control device comprises, when an uncorrectable error occurs during data reading of the file control device of the data transmitting side, there is no means for notifying an error to the file control-device of the data receiving side. That is, there is no such item as an error occurrence flag, which indicates whether or not errors occurred in the data, in the items of the redundancy comprised in data. Therefore, the only way to handle the situation is to stop operations of the transmitting side device.

Especially, when the error detection code (CRC, ECC, Parity etc.) used for transferring the data between file control devices and the error detection code reading the data from a memory in a file control device are different, even though the inconsistency between the read data and the error detection code is detected on reading the data from the memory, a new error detection code is generated for the read data (error data) in transferring the data between devices, and the new error code replaces the previous error detection code. Therefore the inconsistency detected by the previous error detection code cannot be detected by the file control device of the receiving side.

Furthermore, if the error data is stored in a memory of the file control device of the data receiving side, by not detecting the inconsistency of the error data included in the data received by the file control device of the receiving side, then, the data may be garbled in the memory of the receiving file control device. Here, a problem is that when control information or address data is garbled in one device, the data failure of the device could affect the performance of the other devices.

SUMMARY OF THE INVENTION

The present invention was made to solve the above problem, and it is an object of the present invention to provide a highly reliable file control system, in a file control system comprising a plurality of file control devices for data control of an external storage device, eliminating data inconsistency, by preventing error data occurred in the file control device of the transmitting side from being transmitted to the file control device of the receiving side.

In order to achieve the above object, a file control system of the present invention, performs DMA transfer and comprises a plurality of file control devices, each of which is provided between a host computer and an external storage device, and its controlling of writing and reading of data to the external storage device is based on commands from the host computer. A first file control device among the plurality of the file control devices comprises a first memory, which store data of the external storage device and a first error detection code given in advance to the data, a first consistency determination unit for checking the consistency between the data obtained from the first memory and the first error detection code given in advance to the data, a error detection code changing unit, after performing the checking of the first consistency determination unit, for changing the error detection code added to the obtained data from the first error detection code to a second error detection code, a data changing unit, when the inconsistency is detected by the first consistency determination unit, changing at least a part of the data of the processing result of the error detection code changing unit, a DMA transfer execution unit for executing DMA-transfer of the data of the processing result of the error detection code changing unit to a second file control device among the plurality of the file control devices. And the second file control device comprises a second memory capable of storing the data received from the first file control device, a second consistency determination unit for checking the consistency between the second error detection code and the data associated to the second error detection code, which are included in the data received from the first file control device, a data processing unit for discarding data received from the first file control device when the inconsistency is detected by the second consistency determination unit, and for storing the received data in the second memory when the inconsistency is not detected by the second consistency determination unit.

Here, when an inconsistency is detected between the data and the first error detection code given to the data in advance in obtaining the data from the first memory in the first file control device, and, after the detection of the inconsistency, the error detection code given to the obtained data is changed from the first error detection code to the second error detection code, the data changing unit changes at least a part of the data consisting of the second error detection code and the data related to the second error detection code (the processing result data from the error detection code changing unit), and the changed data is sent to the second file control device by the DMA transfer execution unit. Therefore, it is possible to reflect the inconsistency of the data detected, in the first file control device, in data acquisition from the first memory and first error detection code in the second file control device side where the error detecting code added to the obtained data is changed. That is, in the second file control device, the check of the inconsistency between the second error detection code and the data related to the second error detection code, which is both included in the data received from the first file control device, is performed, and the inconsistency is detected. Thus, the received data is discarded without being written in the memory.

It is preferable that a plurality of file control devices is connected by serial interfaces, and that the first file control device further comprises error notification unit for carrying out error notification to the DMA transfer execution unit when the first consistency determination unit detects an uncorrectable error (the inconsistency).

Also preferably, when the first consistency determination unit of the first file control device detects an uncorrectable error during the data transfer of the first file control device and the second file control device, the first consistency determination unit transmits an error-interrupting signal to the error notification unit, and the error notification unit, which received the error-interrupting signal, transmits an error-notifying signal to the DMA transfer execution unit.

More preferably, when the DMA transfer execution unit in the first file control device receives the error-notifying signal during the data transfer of the first file control device and the second file control device, the DMA transfer execution unit cancels data transmission after the reception of the error-notifying signal.

Optimally, the data changing unit in the first file control device changes at least the part of the data of the processing result of the error detection code changing unit (the part of the data which includes the second error detection code and the data associated to the second error detection code) by inverting each bit in the changing portion, and the uncorrectable error is preferred to be multiple bit error.

It is preferred that the file control system configures RAID, and the memory of the first file control device is used as cache memory.

According to the file control system of the present invention, it is possible to establish, eliminating data inconsistency, by detecting an uncorrectable error occurred in the file control device of the data transmitting side in the file control device of the data receiving side and by preventing the receiving file control device from writing the error data. In addition, data transmitting file control device can cancel the data transmission at the same time as occurrence of the uncorrectable error, so it is possible to prevent the error data occurred in the transmitting file control device from being transmitted to the receiving file control device.

DESCRIPTION OF THE PREFERRED EMBODIMENT

In the following description, details of a file control system in an embodiment of the present invention are explained with reference to the drawings. Devices such as a hard disk, a flexible disk, an MO, a CD-R and a magnetic tape, which store data and programs in a computer, are referred to as external storage devices in the present invention. A configuration of the file control system of the present invention is a system with a plurality of file control devices connected to each other by serial interfaces, which performs error detection using a plurality of error detection codes such as CRC, ECC, etc. In the present embodiment, a plurality of the file control devices are connected through a router, however a configuration in which the file control devices are directly connected with each other is also possible.

Figure 1:
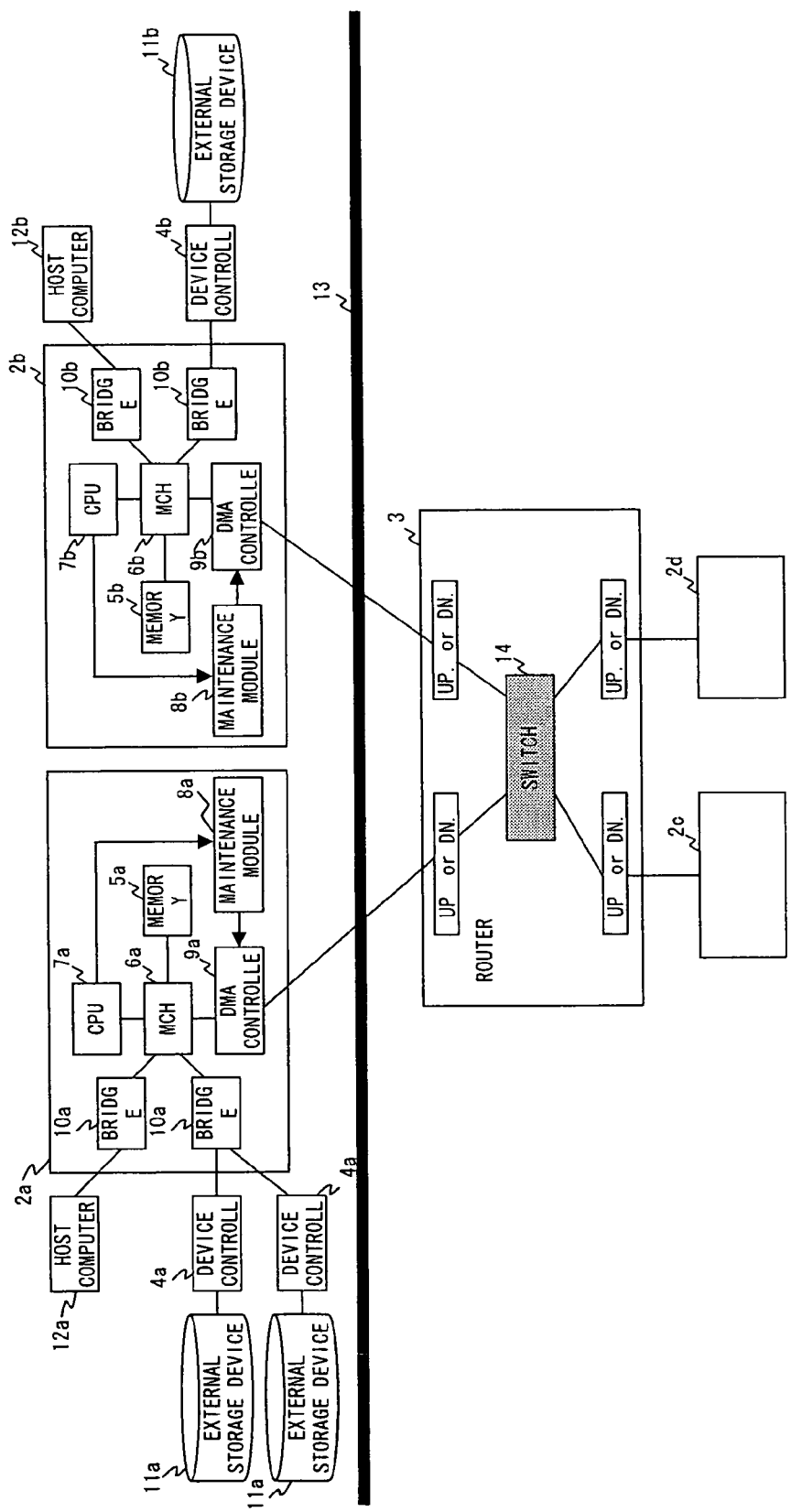
FIG. 1 is a configuration diagram of the file control system in the embodiment of the present invention.

FIG. 1 shows a configuration of a file control system in an embodiment of the present invention. FIG. 1 describes a file control system for carrying out DMA transfer, comprising a plurality of the file control devices writing/reading the data on/from the external storage device following commands from the host computer. A plurality of the file control devices are connected with each other through a router.

A file control system 1 is configured mainly by file control devices 2a, 2b, 2c, 2d and a router 3. In the present embodiment, a first file control device and a second file control device, both transmit/receive data, are labeled as 2a and 2b, respectively, and the first file control device represents a file control device in data transmission side (reading side) and the second file control device represents a file control device in data reception side (writing side). Although descriptions of the file control device 2c and the file control device 2d are omitted, they are assumed to comprise the equivalent function to the file control devices 2a or 2b. In the file control devices 2a and 2b, external storage devices 11a and 11b are connected to bridge chips 10a and 10b through device controllers 4a and 4b in each of the file control device. In the same way, the file control devices 2a and 2b are connected to host computers 12a and 12b, respectively, through the bridge chips 10a and 10b, and takes control of transferring data etc. to the external storage devices 11a and 11b. The bridge chips 10a and 10b are connected to the host computer 12a and 12b by, for example, a fiber channel, ISCSI or OCLINK (Optical Channel LINK) or FCLINK (Fibre Channel LINK). The bridge chips 10a and 10b and the device controllers 4a and 4b are connected by, for example, a fiber channel.

In FIG. 1, four units of the file control device are connected to a router 3, however the device can be added up to eight units, if required. Inside the first file control device 2a and the second file control device 2b comprises memory 5a and 5b, MCHs (Memory Controller Hub) 6a and 6b, CPUs 7a and 7b, maintenance modules 8a and 8b and DMA controllers 9a and 9b, respectively. Between the memory 5a and the MCH 6a and between the memory 5b and the MCH 6b are connected by DDR (Double Data Rate) 266. Between the bridge chip 10a and the MCH 6a, between the MCH 6a and the DMA controller 9a, between the DMA controller 9a and the router 3, and between a port for upstream (UP) or downstream (DN) and a switch 14 in the router 3 are all connected by PCI-Express link (x4) explained later, and so as the bridge chip 10b and the MCH 6b, the MCH 6b and the DMA controller 9b, and the DMA controller 9b and the router 3. In addition, between the file control devices 2a or 2b, and the router 3 is connected by a backplane 13.

The present embodiment has two units of the external storage device 11a connected to the first file control device 2a, and has RAID configuration with mirror ring function, however the number of the connected external storage devices 11a can be only one or can be increased up to the number connectable by the bridge chip 10a. It is possible to use cache memory as the memory 5a and the memory 5b.

In the following description, functions of the first file control device 2a in the present embodiment, are explained. The MCH 6a reads out data from the memory 5a, and transmits the data to the DMA controller 9a. The DMA controller 9a, which received the data, transmits the data to the DMA controller 9b of the second file control device 2b through the router 3. In other words, the MCH 6a and the DMA controller 9a operate as DMA transfer execution means.

A first error detection code (in this case, ECC, Error Correcting Code) is added to the data stored in the memory 5a in advance. The MCH 6a generates another first error detection code by using the data read from the memory 5a, and checks whether the generated first error detection code matches the first error detection code added to the data in advance. By so doing, the data compensation between the memory 5a and the MCH 6a is made. If the result of the check does not match, and the inconsistency is detected, it is considered that an uncorrectable error is detected. When an uncorrectable error is detected, notifies the maintenance module 8a, explained later, of the result. That is, the MCH 6a operates as consistency determination means of the data transmitting side.

Upon detecting uncorrectable errors, the MCH 6a transmits an error-interrupting signal to the CPU 7a. The CPU 7a, which received the error-interrupting signal, transmits an error-notifying signal to the maintenance module 8a. The maintenance module 8a, which received the error-notifying signal, sends an error-notifying signal to the DMA controller 9a explained later. In other words, the MCH 6a, and the maintenance module 8a (and the CPU 7a) operate as error-notifying means.

In the present embodiment, in the first file control device 2a has a specification that a data path between the MCH 6a and DMA controller 9a cannot used the same error detection code as a data path between the memory 5a and the MCH 6a. Therefore, the MCH 6a performs the data compensation between the MCH 6a and the DMA controller 9a by changing the error detection code added to the data from the first error code (ECC) to the second error detection code (CRC).

The DMA controller 9a, upon receiving the error-notifying signal, changes the data to which sending request is issued or the second error detection code added to the data, and performs DMA transfer of the changed data. By performing the data changing process, it is possible to reflect the checking result of the first error detection code in which the inconsistency is detected, to the checking result of the second error detection code checked in the second file control device side. Here, note that the DMA controller 9a operates as data changing means.

The DMA controller 9a, when receiving the error-notifying signal, may ignore the sending request of the data received after reception of the error-notifying signal, and can stop sending data to the second file control device 2b.

In the following description, functions of the second file control device 2b in the present embodiment, are explained. The DMA controller 9b checks the consistency between the second error detection code and the data associated with the second error detection code of the data received from the file control device 2a. In other words, the DMA controller 9b operates as consistency determination means of the data reception side.

If the inconsistency is not detected in the received data from the first file control device 2a, the DMA controller 9b passes the received data to the MCH 6b. By so doing, the received data is written in the memory 5b. When the inconsistency is detected in the received data, on the other hand, the DMA controller 9b discards the data. In other words, the DMA controller 9b operates as data processing means.

PCI-Express was released as an interface standard for chip-to-chip interconnect and general-purpose extended I/O interconnect, and the specification for PCI-Express is established by PCI-SIG (Peripheral Component Interconnect Special Interest Group). PCI-Express is a prospective standard as a next generation interface, which thoroughly converts the existing PCI system adopting a parallel transfer method. The PCI-Express employs a point-to-point serial transfer method. A physical layer comprises two signal lines per one direction, and therefore requires four signal lines for minimum configuration (1-bit serial transfer) to perform a bidirectional data transfer. This minimum configuration is referred to as 1 lane (x1). By aggregating a plurality of the lanes such as 2 lanes (x2), 4 lanes (x4), 8 lanes (x8), 16 lanes (x16), and 32 lanes (x32), as needed, the configuration can provide a desired bandwidth.

Figure 2:
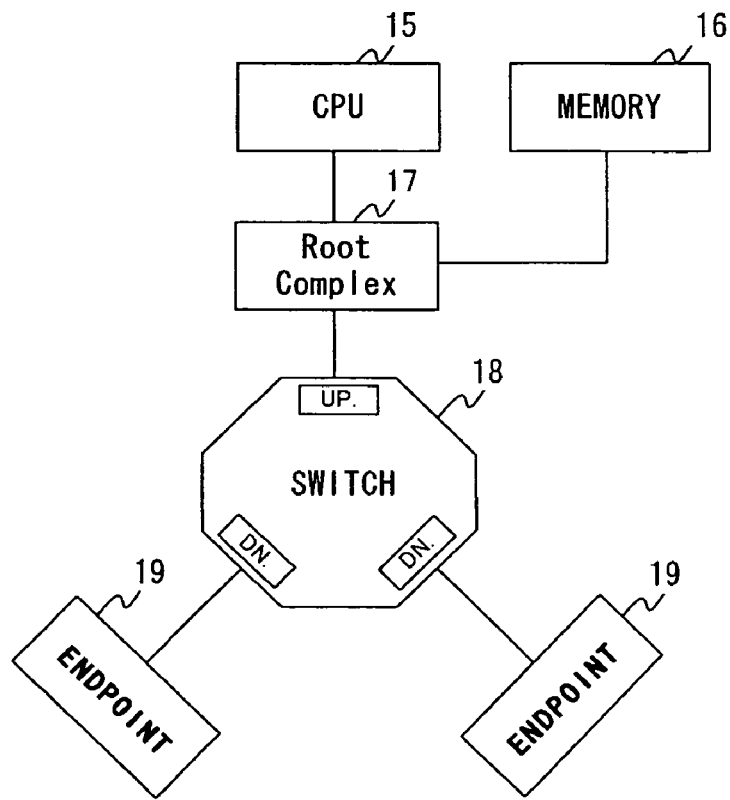
FIG. 2 is a diagram showing a general device configuration using PCI-Express.

FIG. 2 describes a diagram of a common device configuration using such PCI-Express. As explained above, the PCI-Express adopts a serial transfer and uses CRC as an error detection code. The embodiment of the present invention is a file control system established by applying the PCI-Express configuration. However, as long as a configuration uses a different error detection code when transferring data between file control devices and reading data form a memory in a file control device, it is possible to apply the present invention to the configuration.

In FIG. 2, basic configuration of the PCI-Express comprises a CPU 15, memory 16, a Root Complex 17, a switch 18, and an endpoint 19. The Root Complex 17 is the highest-level device in I/O architecture, connecting the CPU 15 and memory 16 subsystem to I/O. The switch 18 comprises three or more of PCI-Express ports, and performs packet routing between the ports. The Root complex 17 is connected to an upstream port (UP), and the endpoint 19 is connected to a downstream port (DN). The endpoint 19 is connected to the Root Complex 17 and the switch 18, and connects memory 16 subsystem to I/O. The configuration is such that all devices are connected by a plurality of serial buses.

Figure 3:
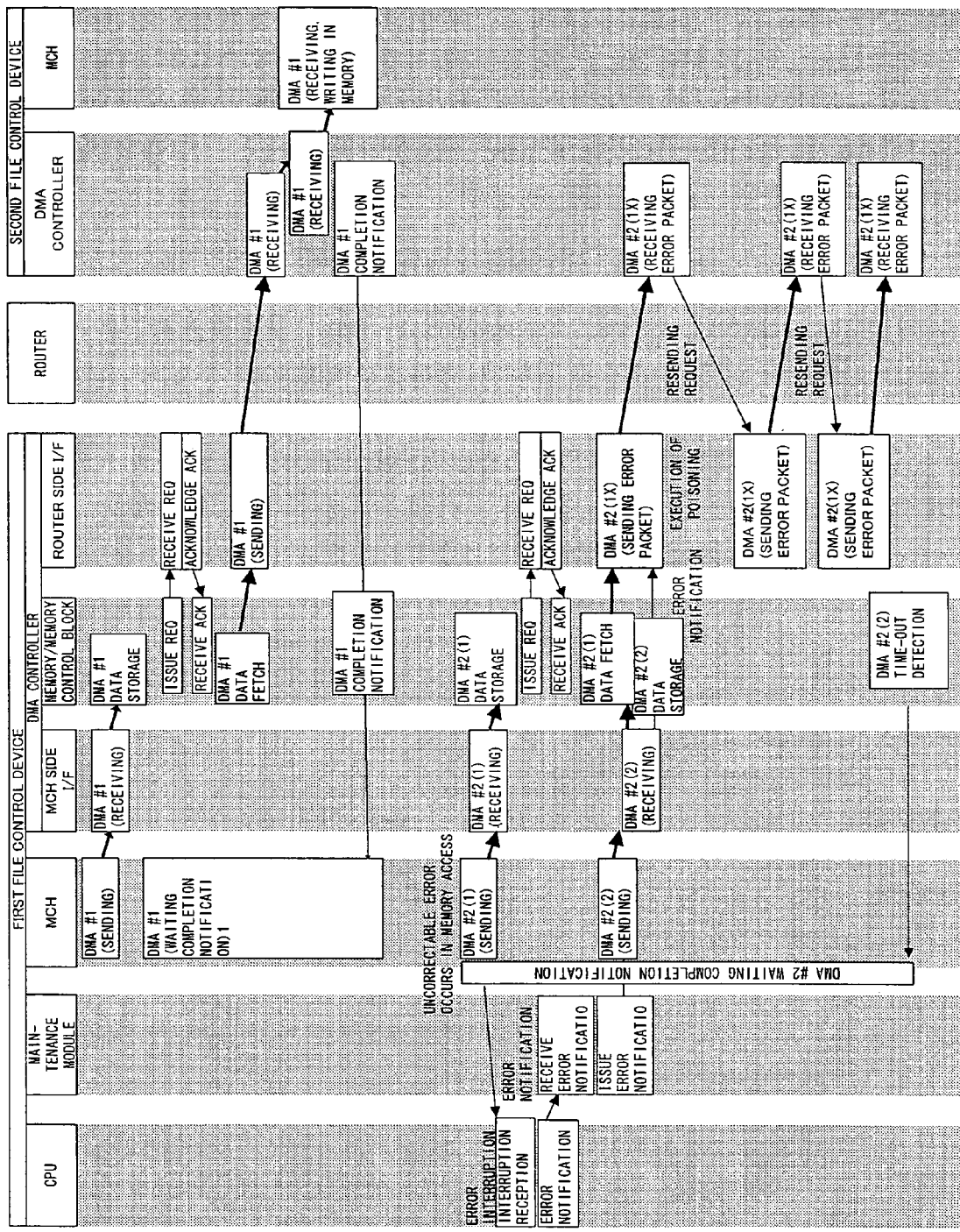
FIG. 3 is a sequence diagram of the entire process of the file control system in the embodiment of the present invention.

Next, more details of the processing inside the file control device of the present invention are explained. FIG. 3 is a sequence diagram of entire processing of the file control system in the embodiment of the present invention. In FIG. 3, the first file control device represents a file control device in data transmission side (reading side), and the second file control device represents a file control device in data reception side (writing side).

First, explanation of normal data transfer processing (when an uncorrectable error does not occur) is provided. First, a MCH of the first file control device reads data DMA#1 in which a first error detection code is added in advance from memory, not shown in the figure, and generates a first error detection code using the data DMA#1, and compares the generated first error detection code with the first error detection code added in advance to the data DMA#1. In this case, the comparison result corresponds, and no inconsistency occurs. Next, the MCH of the first file control device changes the error detection code added to the data from the first error detection code to the second error detection code used for the data compensation between the MCH and the DMA controller, and sends the data DMA#1, which the second error detection code is added to, to an MCH side I/F of the DMA controller. When the MCH side I/F receives the data DMA #1, the data DMA #1 is transferred to internal memory of the DMA controller and is stored in the memory. When the data storage is completed, a memory control block issues data sending request Req to a router side I/F. The router side I/F, which received the data sending request Req, transmits data sending acknowledgement Ack to the memory control block. When the memory control block receives the acknowledgement, the router side I/F starts to fetch the data DMA #1 stored in the memory. When the data fetch of the data DMA #1 is completed, the router side I/F sends the data DMA #1 to the DMA controller of the second file control device through the router.

The DMA controller of the second file control device, which received the data DMA #1, performs check of the second error detection code (CRC) of the received data DMA #1, and sends the data to the MCH, if errors are not detected. The MCH writes the received data DMA #1 in memory. When the writing is completed, a data transmission/reception completion notification is transmitted from the DMA controller of the second file control device to the DMA controller of the first file control device. In the end, a memory control block in the DMA controller of the first file control device, which received the data transmission/reception completion notification, transmits the data transmission/reception completion notification to the MCH, and the process is terminated.

In the following description, data transfer processing when an uncorrectable error occurs while the MCH accesses the memory is explained. Here, the error, detected as an uncorrectable error, is a multiple bit error by the first error detection code, for example, ECC. First, a MCH of the first file control device reads data DMA#2 (1) in which a first error detection code is added in advance from memory not shown in the figure, and generates a first error detection code using the data DMA#2 (1), and compares the generated first error detection code with the first error detection code previously added to the data DMA#2 (1). In this case, the comparison result does not correspond, and inconsistency occurs. Next, the MCH of the first file control device changes the error detecting code added to the data from the first error detection code to the second error detection code, used for the data compensation between the MCH and the DMA controller, and sends the data DMA#2 (1), which the second error detection code is added to, to an MCH side I/F of the DMA controller. The process in the DMA controller, afterward, is the same as the process in the normal data transfer, and thus, an explanation is omitted.

When an uncorrectable error occurrence is detected by the MCH during readout of the data DMA #2 (1) from the memory, the MCH immediately transmits an error-interrupting signal to the CPU. The CPU, which received the interrupting signal, carries out interruption processing, that is, transmitting an error-notifying signal to the maintenance module. The maintenance module, which received the error-notifying signal, transmits an error-notifying signal to the router side I/F of the DMA controller.

When the router side I/F of the DMA controller receives the error-notifying signal during the fetching of the transmitted data DMA #2 (1) from the memory, the router side I/F completes the fetch and adds the second error detection code (CRC) to the end of the data DMA #2 (1), changes the data by poisoning of the second error detection code (CRC), and sends the changed data DMA #2 (1x) to the DMA controller of the second file control device. In the present embodiment, "poisoning" refers to processing, which inverts each bit of CRC added to the end of the data. The present invention is not limited to the process, however, and it is also possible to change an arbitrary part of the data DMA #2(1) after the CRC is added to the end of the data DMA #2.

The DMA controller of the second file control device carries out CRC checking process on the receive data. That is, when the data DMA #2 (1x) with the second error detection code changed is received, the inconsistency is to be detected in the CRC checking process. If the error is detected, the received data is discarded, as data resending request is transmitted to the router side I/F of the first file control device. In response to the request, the router side I/F of the first file control device, which received the data resending request, once again sends the error data DMA #2 (1x). Although, in the present embodiment, the number of times responding to the data resending request (retry number) is set as three times, the number can be changed if necessary. When the amount of time for resending exceeds a preset limit, ultimately, it is recognized as an error. Meanwhile, in the first file control device, because the data transmission/reception completion notification is not received from the second file control device, it is time-out, and the time-out interrupting signal is transmitted to the MCH, and the process terminates as error.

As explained above, in the file control system of the present embodiment, when the MCH 6a detects errors (inconsistency) in the data read from the memory 5a, in the data transfer from the first file control device 2a to the second file control device 2b, error interruption is, first, carried out to the CPU 7a. The CPU 7a, then, transmits error notification to the maintenance module 8a, and from the maintenance module 8a to the DMA controller 9a, the error notification is also carried out. Thus, even when replacing (changing) the error detection code by the new error detection code in transferring the data from the MCH 6a to the DMA controller 9a, the DMA controller 9a, which received the error notification, lets the second file control device recognize that the sent data has inconsistency (errors) by changing the new error detection code included in the sent data.

In the file control device of the present embodiment, MCH is a unit controlling memory, and the error notification cannot be directly transmitted from the MCH 6a to the DMA controller 9a because the MCH and the DMA controller are connected by a serial interface. Therefore, in the file control device 2a, when errors are detected by the MCH 6a, the error is notified to the DMA controller 9a through the CPU 7a, and the maintain module 8a.

The file control device of the present embodiment sends the data read from the memory to transmission destination file control device as soon as possible in order to speed up data transfer. Then, it is possible that, when errors are detected by the MCH 6a, the DMA controller 9a has already started sending the data with errors before receiving the error notification through the CPU 7a and the maintenance module 8a. However, the procedure of the present embodiment lets the transmission destination file control device recognize that the sent data contains errors by changing the CRC added to the end of the sent data. Therefore as long as the time period from error detection by the MCH 6a to reception of the error notification by the DMA controller 9a is shorter than the time period required to send data (for example, a sum of time for memory reading/writing in the DMA controller and sending time of router side I/F), in a system adopting serial interfaces, it is possible to let the transmission destination file control device recognize, without fail, that the send data contains errors.

The file control device of the present embodiment further comprises a function to stop sending data when errors are detected in the data. In other words, as shown in FIG. 3, the sending of data DMA #2 (1) is followed by sending of data DMA #2 (2), which is read from memory not shown in the figures by the MCH, to the MCH side I/F of the DMA controller. When the MCH side I/F receives the data DMA #2 (2), it transfers the data to the internal memory of the DMA controller, and stores the data DMA #2(2) in the memory. Here, the DMA controller receives an error notification of the data DMA #2(1). In such a case, the router side I/F does not send sending acknowledgment Ack in response to the sending request Req from a memory control block of the data DMA #2(2). By so doing, the data DMA #2(2) is not going to be sent. This function, for example, is especially useful when the data DAM #2(1) and #2(2) are acquired from divided large-size data.

As stated above, in the file control system of the present embodiment, it is possible to prevent the second file control device from writing error data in by letting the second file control device detect uncorrectable errors that occurred in the first file control device, and to establish a highly reliable file control system, preventing data inconsistency.

In the occurrence of an uncorrectable error, the first file control device can cancel data sending, and in so doing, it is anticipated to have an effect that transmission of error data created in the first file control device to the second file control device is canceled.

What is claimed is:

1. A file control system performing direct memory access transfer and including a plurality of file control devices, each of the file control devices being provided between a host computer and an external storage device and controlling writing and reading of data to the external storage device based on commands from the host computer, the file control system comprising:
a first file control device among the plurality of the file control devices including:
a first memory to store data of the external storage device and a first error detection code provided to the data in advance;
a first consistency determination unit to check for consistency between data obtained from the first memory and the first error detection code;
an error detection code changing unit to change, after performing the checking of the first consistency determination unit, an error detection code added to the obtained data from the first error detection code to a second error detection code;
a data changing unit to change, when an inconsistency is detected by the first consistency determination unit, at least a part of the data of the processing result of the error detection code changing unit; and
a direct memory access transfer execution unit to execute direct memory access transfer of the data of the processing result of the error detection code changing unit to a second file control device among the plurality of the file control devices,
the second file control device including:
a second memory to store the data received from the first file control device;
a second consistency determination unit to check consistency between the second error detection code and the data associated to the second error detection code, which are included in the data received from the first file control device; and
a data processing unit to discard the data received from the first file control device when an inconsistency is detected by the second consistency determination unit, and to store the data received from the first control device in the second memory when the inconsistency is not detected by the second consistency determination unit.

2. The file control system according to claim 1, wherein the first file control device further includes an error notification unit to notify the direct memory access transfer execution unit of errors when the first consistency determination unit detects the inconsistency.

3. The file control system according to claim 2, wherein, in the first file control device, a time period from the detection of the inconsistency by the first consistency determination unit to the reception of the corresponding error notification by the data changing unit through the error notification unit is set to be shorter than a time period from the detection of the inconsistency by the first consistency determination unit to the reception of the data of the processing result of the error detection code changing unit by the direct memory access transfer execution unit.

4. The file control system according to claim 2, wherein the first consistency determination unit transmits an error interrupting signal to the error notification unit when the first consistency determination unit detects the inconsistency, and the error notification unit, which received the error interrupting signal, transmits an error-notifying signal to the direct memory access transfer execution unit.

5. The file control system according to claim 2, wherein the direct memory access transfer execution unit cancels sending data after receiving the error-notifying signal.

6. The file control system according to claim 1, wherein the data changing unit changes at least the part of the data of the processing result of the error detection code changing unit, for the data which is held in the direct memory access transfer execution unit, and the sending request has been issued to.

7. The file control system according to claim 1, wherein a plurality of the file control devices is connected with each other by serial interfaces.

8. The file control system according to claim 1, wherein the data changing unit changes at least the part of the data of the processing result of the error detection code changing unit by inverting each bit in the changing portion.

9. The file control system according to claim 1, wherein the error is an uncorrectable multiple-bit error.

10. The file control system according to claim 1, wherein the file control system constitutes RAID.

11. The file control system according to claim 1, wherein memory in the first file control device is used as cache memory.

12. A file control device, used in a file control system performing direct memory access transfer and including a plurality of file control devices, each of the file control device being provided between a host computer and an external storage device and controlling writing and reading of data to the external storage device based on commands from the host computer, the file control device comprising:
a memory to store data of the external storage device and a first error detection code provided to the data in advance, and data received from a first different one of the plurality of file control devices;
a first consistency determination unit to check consistency between data obtained from the memory and the first error detection code;
an error detection code changing unit to change, after performing the checking of the first consistency determination unit, an error detection code added to the obtained data from the first error detection code to a second error detection code;

a data changing unit to change, when an inconsistency is detected by the first consistency determination unit, at least a part of the data of the processing result of the error detection code changing unit;

a direct memory access transfer execution unit to execute direct memory access transfer of the data of the processing result of the error detection code changing unit to the first different one or a second different one of the plurality of the file control devices;

a second consistency determination unit to check the consistency between a third error detection code and data associated with the third error detection code, which are included in the data received from the first different one of the plurality of file control devices; and a data processing unit to discard data received from the first different one of the plurality of file control devices when an inconsistency is detected by the second consistency determination unit, and to store the received data in the memory when the inconsistency is not detected by the second consistency determination unit.

13. The file control device according to claim 12, further comprising an error notification unit to notify the direct memory access transfer execution unit of errors when the first consistency determination unit detects the inconsistency.

14. The file control device according to claim 13, wherein, a time period from the detection of the inconsistency by the first consistency determination unit to the reception of the corresponding error notification by the data changing unit through the error notification unit is set to be shorter than a time period from the detection of the inconsistency by the first consistency determination unit to the reception of the data of the processing result of the error detection code changing unit by the direct memory access transfer execution unit.

15. The file control device according to claim 12, wherein the data changing unit changes at least the part of the data of the processing result of the error detection code changing unit, for the data which is held in the direct memory access transfer execution unit, and the sending request has been issued to.

16. A file control system performing direct memory access transfer, the file control system comprising:

a first file control device and a second file control device, the first file control device including:

a first memory to store data received from an external storage device and a first error detection code, the received data being associated with a second error detection code;

a first determination unit to obtain the second error detection code, and to check for errors within the stored data based on a comparison of the first error detection code and the second error detection code;

an error detection code unit to replace the first error detection code associated with the received data with a third error detection code;

a data changing unit to change at least a part of the received data when an error is detected;

a direct memory access transfer execution unit to execute direct memory access transfer of a result of the error detection code unit and the data changing unit to the second file control device as first device data;

the second file control device including:

a second memory to store the first device data;

a second determination unit to check for errors within the first device data based on the first device data and the third error detection code associated with the first device data; and a data processing unit to discard the first device data if an error is detected and to store the first device data in the second memory if the error is not detected by the second consistency determination unit.

* * * * *